July 12, 1927.
J. MARETTE
1,635,681
ANTISTATIC PHOTOGRAPHIC FILM
Filed June 30, 1925
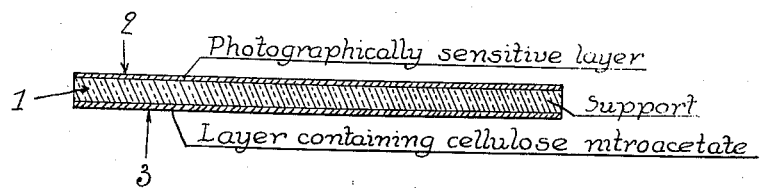
Jacques Marette
INVENTOR
By Otto Munk
his ATTY Patented July 12, 1927.

1,635,681

UNITED STATES PATENT OFFICE.

JACQUES MARETTE, OF VINCENNES, FRANCE, ASSIGNOR TO PATHÈ CINÉMÀ, ANCIENS ETABLISSEMENTS PATHÈ FRERES, OF PARIS, FRANCE.

ANTISTATIC PHOTOGRAPHIC FILM.

Application filed June 30, 1925, Serial No. 40,690, and in France May 26, 1925.

Motion picture films wherein the support or backing consists of a material having nitrocellulose as a base, have a serious drawback from the fact that the film is easily electrified when in contact with the parts of the apparatus serving either for the manufacture or for the utilization of the film. The electrifying of the film is made evident by the characteristic formation on the film of marks which are due to electric sparks produced by static discharges; such marks appear upon the image after developing, and cannot be eliminated.

Attempts have already been made to obviate this electrifying effect, and to manufacture films which are exempt from such discharges, these being termed "antistatic" films. It has for instance been proposed to utilize the property possessed by certain cellulose compounds which become charged with electricity of contrary sign, and for this purpose a mixture of cellulose acetate and nitrocellulose, has been employed either to form the support of the film or to serve as an antistatic coating.

It has also been proposed to utilize as antistatic coating, ethylcellulose either alone or mixed with cellulose acetate or nitrocellulose.

The aforesaid methods offer various drawbacks, and the object of the present invention is to obviate these drawbacks.

An embodiment of the invention is shown by way of example, on the drawing.

According to the invention the film, whose backing or support 1 consists of a substance having nitrocellulose as a base is coated upon the back, i. e. upon the face opposite that coated with the emulsion 2, with a coating 3 of a protecting and antistatic nature consisting of a substance having as a base plastic cellulose nitroacetate.

The cellulose nitroacetate which is a complex cellulose ester can be, but to a very slightly appreciable extent, electrified, and especially when combined with softeners. In this event it forms an approved protecting substance for the nitrocellulose support, and prevents the latter from being electrified.

The said protecting and antistatic coating 3 having cellulose nitroacetate as a base is applied in a very thin coat upon the back of the support of the film by means of a known solvent, and the photographic emulsion 2 is coated upon the other face, so that the support of the film will be entirely protected.

The said coating is prepared by dissolving cellulose nitroacetate in a solvent which will also dissolve nitrocellulose, such as acetone or the like; the amount of solvent used will depend upon the concentration and the thickness of the desired coating. To the said solution is added, in the usual proportions, the known softeners such as tricresylphosphate, triphenylphosphate, etc., which impart to the resulting product the desired flexibility and incombustibility, and augment its antistatic qualities.

The said coating may be prepared without the use of softeners, but it has been observed that the best results are obtained when the cellulose nitroacetate is rendered plastic.

Having now described my invention, what I claim as new and desire to secure by Letters Patent is:

1. An antistatic film comprising a film support, one face whereof is coated with sensitive emulsion, while its other face is coated with a coating comprising cellulose nitroacetate.

2. An antistatic film comprising a film support, one face whereof is coated with sensitive emulsion, while its other face is coated with a coating comprising plastic cellulose nitroacetate.

In testimony whereof I have signed my name to this specification.

JACQUES MARETTE.